Figure 1:
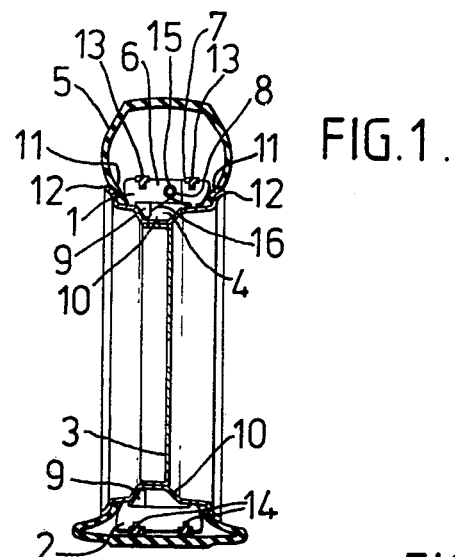

United States Patent [19]

Heath-Coleman

[11] 4,318,435

[45] Mar. 9, 1982

[54] STRUCTURE FOR USE WITH A PNEUMATIC TIRE PROVIDING SUPPORT IN THE EVENT OF DEFLATION

[76] Inventor: Roy A. Heath-Coleman, 4 Brookfield, Sandhurst, Kent, England

[21] Appl. No.: 165,126

[22] PCT Filed: Feb. 8, 1979

[86] PCT No.: PCT/GB79/00026

§ 371 Date: Oct. 10, 1979

§ 102(e) Date: Oct. 4, 1979

[87] PCT Pub. No.: WO79/00612

PCT Pub. Date: Sep. 6, 1979

[30] Foreign Application Priority Data

Feb. 10, 1978 [GB] United Kingdom .................. 5474/78

[51] Int. Cl.³ .............................................. B60C 17/04
[52] U.S. Cl. .............................. 152/158; 152/330 RF; 152/400
[58] Field of Search ................................ 152/151–152, 152/157–158, 165, 330 RF, 400–401

[56] References Cited

U.S. PATENT DOCUMENTS

| 3,587,702 | 6/1971 | Kaunitz | 152/158 |
|---|---|---|---|
| 3,828,836 | 8/1974 | Bradley | 152/158 |
| 3,872,907 | 3/1975 | Curtiss, Jr. et al. | 152/158 |
| 4,159,730 | 7/1979 | Osada et al. | 152/158 |
| 4,177,849 | 12/1979 | Osada et al. | 152/158 |

FOREIGN PATENT DOCUMENTS

| 1560299 | 2/1969 | France . |
|---|---|---|
| 1449416 | 9/1976 | United Kingdom . |
| 2000733 | 1/1979 | United Kingdom . |

Primary Examiner—Edward C. Kimlin
Assistant Examiner—Lois E. Boland
Attorney, Agent, or Firm—Emory L. Groff, Jr.

[57] ABSTRACT

A structure for fitting around the rim of vehicle wheel and within the tire provides, on deflation of the tire, support for the tire at the ground bearing point and prevents dislocation of the tire beads thus enabling control and reasonable "run-flat" travel to be retained in the event of a puncture. The structure comprises a number of elongate block members (1, 2) which lie transversely across the well (10) in the rim of the wheel (3). The blocks are spaced and retained by reinforced rubber belts (13) and are dimensioned to prevent displacement of the tire beads (11). To enable a tire to be fitted or removed some, at least, of the blocks (1) are in two parts (6, 8) with a pivotal interconnection (15) allowing the center of the block to move away from the rim and the ends to move together thus allowing space for the tire bead to enter the well, this being effected automatically on insertion of a tire lever under the tire bead. Springs (16) ensure the parts of the block return when the tire beads are seated normally. The blocks may include lugs (9) which bear on the base of the well. A majority of blocks (2) need have no pivot.

13 Claims, 12 Drawing Figures

U.S. Patent  Mar. 9, 1982  Sheet 1 of 4  4,318,435

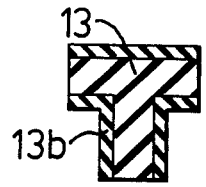
FIG. 4.   FIG. 5.
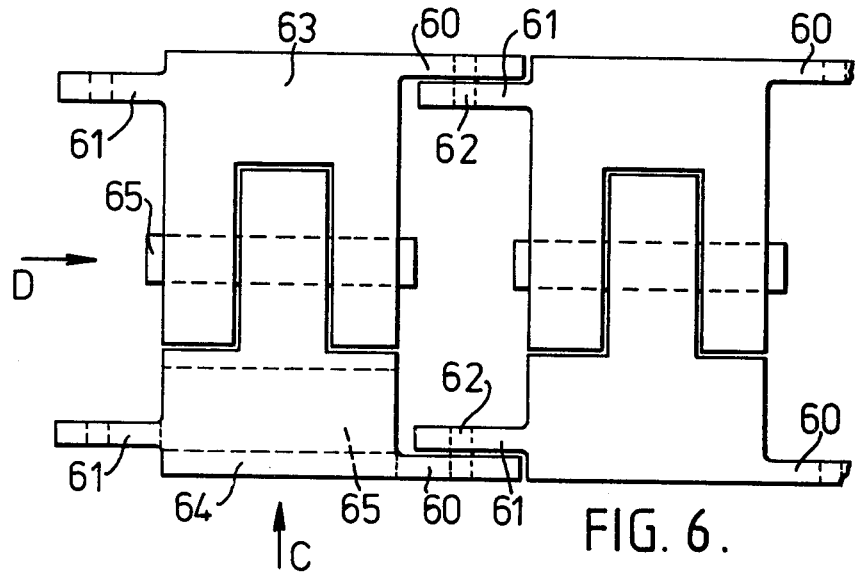
FIG. 6.
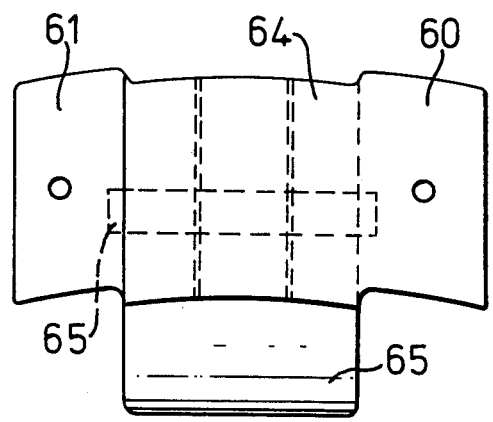
FIG. 7.

STRUCTURE FOR USE WITH A PNEUMATIC TIRE PROVIDING SUPPORT IN THE EVENT OF DEFLATION

This invention relates to a structure for use within a pneumatic tire and providing support for the tire in the event of deflation enabling a vehicle to travel a limited distance in reasonable safety, the structure providing support between the deflated tire and wheel rim and further retaining the tire beads in the well of the rim. In a known system, allowing a vehicle to continue travel following deflation of a tire, a special tire is used having reinforced side walls with an internal lubricant ejected from canisters around the rim. The system cannot be used with any tire and also requires replacement after operation. Another system proposed has blocks moulded integrally inside the tire. This again needs a specially constructed tire and as the blocks are non-removable these have to be replaced along with the tire when the latter has worn.

This invention seeks to provide a structure which can be readily fitted to new or existing vehicle wheel and tire assemblies without requiring special skill or machinery and which functions to provide support for the tread in contact with the road and retains the tire beads in position on the rim in the event of deflation, thus allowing the tire to run flat with reasonable vehicle control being retained.

According to this invention there is provided a structure for location around the periphery of a wheel rim and within a tire fitted thereto the structure providing support for the load bearing part of the tire in the event of deflation, characterised by a plurality of block members locatable within the rim and extending transversely across the well with the ends adjacent respective ones of the tire beads when seated normally in the rim, the block members being spaced around the rim and flexibly interconnected by linking means to form a structure of annular form securable around the rim, some, at least, of adjacent block members being formed of two parts interconnected through a pivot whereby the parts may be pivoted and lifted at the centre to move away from the rim and tire beads to enable the tire bead to enter the well of the rim during fitting.

In one preferred embodiment the block members are interconnected by two resilient belts which engage with and secure to respective ones of two spaced channels in the outer surface of each block. For the block members formed from two parts a channel is provided in each part.

For convenience all the block members are formed of two parts with the pivotal interconnection and this enables the blocks of any portion of the structure to be pivoted and to facilitate tire fitting or removal. The two parts preferably include a spring means, or other device, tending to restore the two parts to the in use condition so that location of the structure around the rim is made easier and the parts return to the in use condition after lifting to fit a tire.

The resilient belts preferably are of T-shape section with the channels in the block members of complementary shape whereby the belts engage the channels to provide a flush surface with the block. The portions of the belts lying between the block members will preferably be thickened in sectional profile thus affording more rigid support for the tire in the region between adjacent block members and also providing location of the block members by defining zones of normal cross-sectional profile which fit the channels in the blocks.

It is also possible to locate and retain the blocks to the belts by means of rivets or the like securing device. Securing by adhesive is a further possibility.

The material selected for the blocks requires sufficient strength for support of the axle load through the tire and shock absorbing characteristics as well as frictional grip between the blocks and rim and blocks and tire. Suitable materials comprise rubber compositions, such as a polyurethane and latex composition or synthetic plastics.

The ends of the structure may include link means which can be interconnected after the structure has been fitted around the rim. Engagement points for a traction tool may be included to facilitate drawing the structure into tight engagement with the rim prior to coupling the link means.

Preferably, the locating belts are of strong and flexible construction with a suitable reinforcing material, exemplified by polyester, rayon, glass fibre or the like. Within the spaces between the block members the top of the belts may have raised top section to compensate for load causing depression and hence "lumpy" running.

The structure in accordance with the invention retains a tire on the wheel rim after deflation and the tire tread remains in good contact with the road surface and retains grip. The tire beads remain in situ and cannot slide together or into the well of the wheel rim. The sidewall surfaces of the tire are prevented from coming into rubbing contact by virtue of support given by the blocks to the tire thus reducing friction which could cause combustion. It is possible to steer, brake and stop a vehicle under control.

It has further been found that the invention allows good air circulation within the tire by reason of the spacing between the block members and open construction of the drive belts and this has a significant effect on tire temperature. Tests have shown that on reducing the free air space temperatures can rise to high values and it is preferable to provide the smallest volume for the blocks consistent with good support action. The height of the blocks also governs the free air space.

The assembly according to the invention can be fitted without requiring special wheels or tires and may be re-used after a tire change and further permits wheel balancing to normal commercial tolerances.

By using the extra thickness in the belts between block members the shouldered location affords a safeguard against a "concertina" action during braking. The raised sections on the belts between the block members not only compensate for deflection under load but also transmit a slight vibration to the driver indicating the occurrence of a deflation.

In an alternative embodiment, within the scope of the invention, each block member includes spaced lugs extending laterally from each side and pivotally connected with the lugs of an adjacent block thus forming a linking means.

In such an arrangement some, but preferably all, the block members are of two parts interconnected by the pivot and by virtue of the lugs being somewhat flexible and the pivotal connections being loose the parts of the block members may be lifted up in the centre away from the rim to allow tire fitting by virtue of the outer ends of the blocks moving inwards.

In this embodiment the structure is formed from a number of block members all of identical form and thus affords simple manufacture and assembly.

It is preferable to include a projection towards one side and below each of the support blocks which is of a size such that it bears on the base of the wall of the wheel and thus supports one side of the block, the other side being supported on the rim. The purpose of this arrangement is to avoid problems from displacement of the block member from the narrow shoulder to one side of the well in certain constructions of wheel rims.

In a modification the block members are made integral with the linking means, with the whole structure being of a flexible material and capable of being expanded slightly lengthwise to provide tight fitting around a rim.

Generally some sixteen to twenty-four block members will be provided for a wheel.

A further preferred embodiment provides for coacting projections and detent means on respective parts of a block member to retain the parts temporarily in a required relationship about the pivot interconnection.

Figure 2:
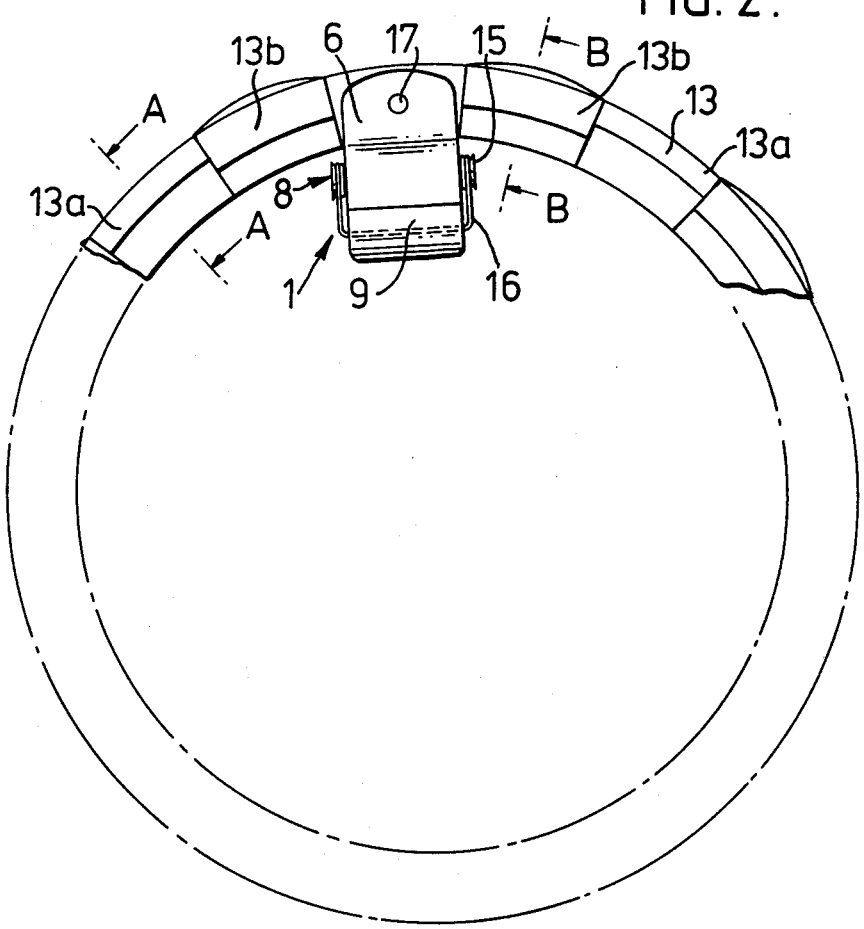
Figure 3:
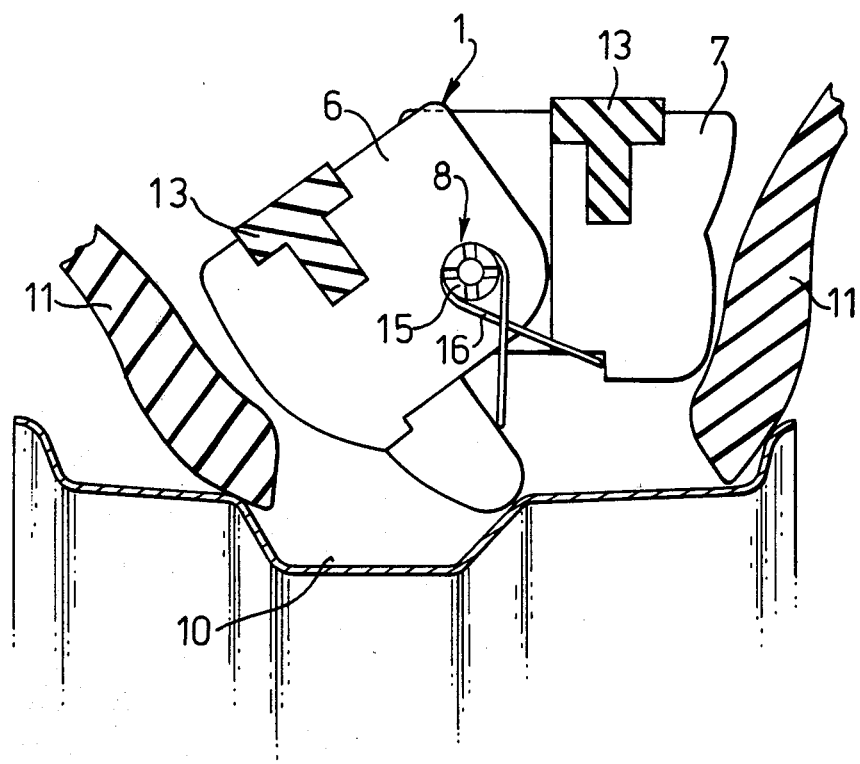
Figure 8:
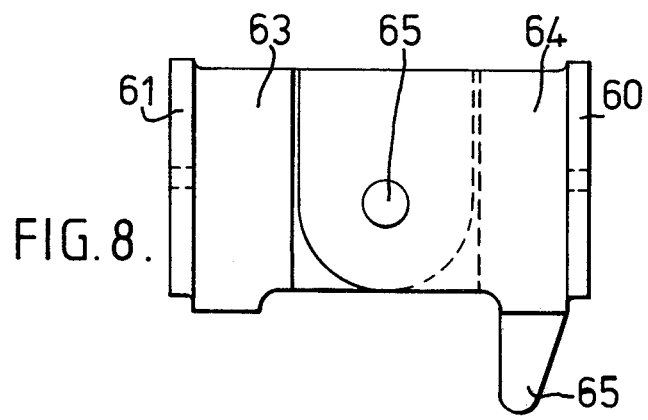
Figure 9A:
Figure 9B:
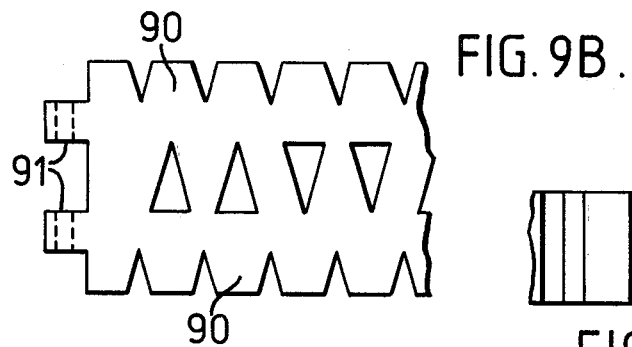
Figure 10A:
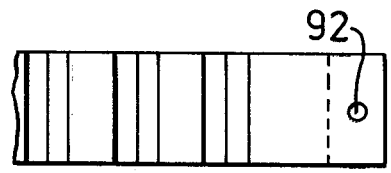
Figure 10B:
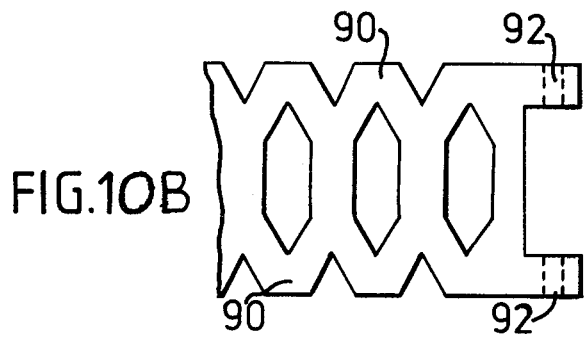

The invention is further described and illustrated by way of example and with reference to the accompanying drawings, where:

FIG. 1 shows a transverse cross section through a motor vehicle wheel and tire including one embodiment of the structure according to this invention, FIG. 2 shows a side elevation of the structure of FIG. 1 with one block member only shown, FIG. 3 shows a part cross section illustrating the position to which the parts forming a block member pivot to allow fitting or removal of a tire, FIG. 4 shows a cross section on A—A of FIG. 2, FIG. 5 shows a cross section on B—B of FIG. 2, FIG. 6 shows in plan view two block members of a modified embodiment, FIG. 7 shows a side view of one block member looking in direction C of FIG. 6, FIG. 8 shows an end view of one block member looking in direction D of FIG. 6, FIGS. 9A and 9B show respectively side and plan views of a unitary structure according to the invention, and FIGS. 10A and 10B show respectively side and plan views of a further unitary structure.

Referring to FIGS. 1 to 3 of the drawings the structure according to the invention comprises a plurality of block members 1 or 2 of elongate form and arranged to lie transversely across the rim of a wheel 3 so as to bridge the region of the well 4 provided for the purpose of receiving the bead of a tire 5 to enable same to be fitted to the rim. The block members 1 comprise two parts 6 and 7 which are pivotally interconnected at by a pivot axis lying parallel to a tangent to the rim 8. The block members 2 are of a one-piece construction. Because of tolerances in the wheel rim and bead thickness in certain cases the portion of the rim to one side of the well cannot be easily defined and there is therefore provided a lug 9 which rests on the base of the well 10. The rim to the other side of the well is wider and provides sufficient support for the other end of the block 1 or 2. The transverse width defined between the ends of a block 1 or 2 is such that there is sufficient room to receive beads 11 of a tire between the ends of the block and the flange 12 of the rim.

The block members are retained by two rubber belts of annular form and of T-shape in cross section. These belts 13 serve both to secure and maintain the spacing of the block members and to retain same firmly against the wheel rim. To achieve this each belt, as shown in FIGS. 2, 4 and 5, comprises a basic section as in FIG. 4 which lies within suitably shaped channels 14 provided within the block members and is of a thickened form as shown in section in FIG. 5 at the portions of the belt which extend between the block members.

The block members are inter connected through pivot pin 15 provided with a spring 16 which tends to urge two parts of the block member 1 into the position of normal use as illustrated in FIG. 1. In FIG. 2 only one block member is shown attached to one of the belts 13 with the parts 13A of the belt having the section of FIG. 4 and the parts 13B having the section of FIG. 5 which comprises the basic belt 13 with additional moulded on material 13B. The bottom portion of the tire as shown in FIG. 1 illustrates the condition on deflation whereby the blocks support the tire tread and prevent the side walls coming into contact. The wheel loading acts to maintain the block in position and by virtue of this the beads of the tire are also prevented from either riding over the wheel rims or dropping into the well 10.

In order to fit or remove the tire from the rim certain blocks 1 are provided and when a tire lever is applied to the bead in the region of these blocks the pivotal connection between the two parts allows the centre to move upwardly whilst the ends of the block move inwards to allow sufficient room for the bead 11 of the tire to enter the well 10. This is illustrated in FIG. 3. In practice it is only required to have a few of the blocks of the type 1 and provided the tire fitter knows their position in relation to the wheel rim, suitable fitting or removal of the wheel can be carried out. However, in practice it is preferable to have all the block members of the type 1 and with such an arrangement the tire may be removed by application of a lever from any position.

The two belts 13 in the embodiment described serve as a linking means for positioning and retaining all the block members on the wheel rim and this assembly may be constructed of annular form for fitting to the wheel or may be in a length with connecting means being provided and at each end for coupling after placement around the wheel rim. In such a case a fitting tool would be provided in order to apply tension to the ends of the structure after placing around the wheel and to enable the securing means to be fitted to link the ends.

The block members may be secured to the belts 13 by means of rivets 17 or similar attachment devices, or alternatively a glued connection may be used.

An alternative embodiment is illustrated in FIGS. 6 to 8 of the drawings wherein the flexible connection between adjacent block members is formed by a linking means comprising lugs 60 on each block member or part thereof which can be coupled with lugs 61 of an adjacent block member by means of pins 62. In this embodiment also each block member is formed from two parts 63 and 64 which are pivotally inter connected by a pin 65. The part 64 further includes downward extending lug 65 serving to bear on the base of the well in the rim. In this embodiment the upper surface of the lugs 60, 61 is raised above the surface of the parts 63 and 64 in order to allow for any slight deflection of the lugs due to loading.

In the embodiments of FIGS. 1 to 5 the belt 13 includes the additional moulded material at the positions 13B which form a surface which is raised above that of the blocks 1 or 2 for a similar purpose. By raising portions of the linking means in this way a warning is given to the driver of the vehicle by virtue of the slight irregularity in running which becomes evident.

The embodiment shown in FIGS. 6 to 8 is fitted to a wheel rim using a tool which engages free ends of the structure and draws same together to enable a link pin to be inserted.

A modification is shown in FIGS. 9 to 10 and in this version the block members 90 are integral with the linking means forming flexible inter connection. In these embodiments the incisions and apertures made into the material of the structure, generally being of a rubber composition, provide longitudinal extension and enable the band to be stretched around the wheel rim using a suitable tool after which a linking means can be inserted through apertures 91 and 92 in respective ends of the structure. In this embodiment if the structure is made of sufficient extensibility then it is unnecessary to provide the pivotal inter connection at the centre and removal of the tire can be made following distension of the structure allowing the tire bead to slide beneath same and drop into the well of the rim.

With the structure according to the invention the tire may be of any type and furthermore the structure may be fitted as original equipment to vehicles or may be subsequently fitted to existing vehicles without difficulty.

I claim:

1. A structure for location around the periphery of a wheel rim including a well and within a tire fitted thereto the structure providing support for the load bearing part of the tire in the event of deflation, characterised by a plurality of resilient block members locatable within the rim and extending transversely across the well with the ends adjacent respective ones of the tire beads when seated normally in the rim, the block members being spaced around the rim and flexibly interconnected by linking means to form a structure of annular form securable around the rim wherein the linking means provides a surface raised above the block members at locations between two adjacent block members, some, at least, of adjacent block members being formed of two parts hingedly interconnected by a pivot axis lying parallel to a tangent to the rim whereby the parts may be angularly displaced about the hinge connection and lifted at the centre to move away from the rim and tire beads to enable the tire bead to enter the well of the rim during fitting.

2. A structure as claimed in claim 1, wherein all the block members are formed of two parts with the pivotal interconnection.

3. A structure as claimed in claim 1, wherein the block members formed of two parts include coacting surfaces which abut when the the two parts lie in coplanar relationship and spring means urging the said surfaces into abutment.

4. A structure as claimed in claim 1, wherein a projection is located towards one side and below each of the support blocks, said projection bearing on the base of the well of the wheel to provide support of said one side of the block, the other side of said block being supported on the rim.

5. A structure according to claim 1, wherein the said linking means comprises two resilient belts, each block member having two spaced channels on the outer surface thereof, the belts engaging with and secured to respective ones of the channels.

6. A structure as claimed in claim 5, wherein the resilient belts are of T-shape section with the channels in the block members of complementary shape, the belts engaging the channels to provide a flush surface with the block.

7. A structure as claimed in claim 5, wherein the portions of the belts lying between adjacent block members are thickened in sectional profile.

8. A structure as claimed in claim 5, wherein the block members are secured to the belts by rivet means or an adhesive.

9. A structure as claimed in claim 1, wherein said linking means for each block member comprises spaced lugs extending laterally from each side thereof and connected by a pivot with the lugs of an adjacent block.

10. A structure as claimed in claim 9, wherein the lugs are flexible and the pivotal connections are loose enabling the parts of the block members to be lifted in the centre about the hinge connection away from the rim.

11. A structure as claimed in claim 1, wherein coacting projections and detent means are provided on the respective parts of a two part block member to retain the parts temporarily in a required angular position about the hinge interconnection.

12. A structure as claimed in claim 1, wherein ends of the structure have co-operating link means which can be interconnected when the structure has been fitted around a wheel rim.

13. A structure as claimed in claim 12, wherein engagement points for a traction tool are provided at each end to effect drawing of the ends together.

* * * * *